(12) United States Patent
Enguent

(10) Patent No.: US 7,880,588 B2
(45) Date of Patent: Feb. 1, 2011

(54) RESISTIVE AND CAPACITIVE MODULATION IN AN ELECTROMAGNETIC TRANSPONDER

(75) Inventor: Jean-Pierre Enguent, Saint Savournin (FR)

(73) Assignee: STMicroelectronics S.A., Montrouge (FR)

( * ) Notice: Subject to any disclaimer, the term of this patent is extended or adjusted under 35 U.S.C. 154(b) by 300 days.

(21) Appl. No.: 11/001,762

(22) Filed: Dec. 2, 2004

(65) Prior Publication Data

US 2005/0122212 A1 Jun. 9, 2005

(30) Foreign Application Priority Data

Dec. 5, 2003 (FR) ..................... 03/50990

(51) Int. Cl.
*H04Q 5/22* (2006.01)
*G08B 13/14* (2006.01)
(52) U.S. Cl. .................... 340/10.3; 340/10.1; 340/10.4; 340/572.5; 340/572.1; 235/451; 235/492; 235/384; 375/258; 375/261
(58) Field of Classification Search ............. 340/572.5, 340/572.1, 10.3, 10.4, 10.1; 235/451, 492, 235/384; 375/258, 261; 702/79, 106, 107, 702/85; 341/53
See application file for complete search history.

(56) References Cited

U.S. PATENT DOCUMENTS

| | | | | |
|---|---|---|---|---|
| 4,818,855 A * | 4/1989 | Mongeon et al. | ............ | 235/440 |
| 5,113,184 A * | 5/1992 | Katayama | ................ | 340/10.51 |
| 5,218,343 A * | 6/1993 | Stobbe et al. | ............ | 340/573.4 |
| 5,396,251 A * | 3/1995 | Schuermann | ................ | 342/51 |
| 5,440,594 A * | 8/1995 | Lechleider | .................. | 375/354 |
| 5,940,006 A * | 8/1999 | MacLellan et al. | ......... | 340/10.1 |
| 6,079,622 A * | 6/2000 | Goto | .......................... | 235/492 |
| 6,147,605 A * | 11/2000 | Vega et al. | ............... | 340/572.7 |
| 6,167,094 A * | 12/2000 | Reiner | ......................... | 375/258 |
| 6,172,608 B1* | 1/2001 | Cole | ........................ | 340/572.1 |
| 6,249,212 B1* | 6/2001 | Beigel et al. | ............. | 340/10.34 |
| 6,356,198 B1* | 3/2002 | Wuidart et al. | ........... | 340/572.5 |
| 6,624,743 B1 | 9/2003 | Ikefuji et al. | | |
| 6,762,683 B1* | 7/2004 | Giesler | ..................... | 340/572.8 |
| 6,778,070 B1* | 8/2004 | Thomas | ..................... | 340/10.1 |
| 7,003,048 B1* | 2/2006 | Eibel et al. | .................. | 375/295 |
| 7,139,537 B2* | 11/2006 | Nakayama | ............... | 455/127.1 |

FOREIGN PATENT DOCUMENTS

WO WO 00/70552 A1 11/2000

OTHER PUBLICATIONS

French Search Report from French Patent Application 03/50990 filed Dec. 5, 2003.

* cited by examiner

*Primary Examiner*—Brian A Zimmerman
*Assistant Examiner*—Nam V Nguyen
(74) *Attorney, Agent, or Firm*—Lisa K. Jorgenson; James H. Morris; Wolf, Greenfield & Sacks, P.C.

(57) ABSTRACT

The selection of at least one back-modulation element of an electromagnetic transponder from among a plurality of resistive and/or capacitive modulation elements of the load of an oscillating circuit of the transponder, including selecting the modulation element(s) according to a binary message received from a read/write terminal.

23 Claims, 3 Drawing Sheets

REQB →
← ATQB

RESISTIVE AND CAPACITIVE MODULATION IN AN ELECTROMAGNETIC TRANSPONDER

BACKGROUND OF THE INVENTION

1. Field of the Invention

The present invention relates to data transmission systems with electromagnetic transponders and, more specifically, to the data transmission from a contactless and wireless electromagnetic transponder to a read/write terminal.

2. Discussion of the Related Art

Electromagnetic transponders to which the present invention more specifically applies are transceivers with no autonomous power supply, which extract the power required by the electronic circuits that they comprise from a high-frequency field radiated by the antenna of the read/write terminal. Such electromagnetic transponders are based on the use of oscillating circuits on the transponder side and on the read/write terminal side. These circuits are coupled by a close magnetic field when the transponder enters the field of the read/write terminal.

The terminal's oscillating circuit is excited by a high-frequency signal (for example, 13.56 MHz) to be sensed by a transponder. When the transponder is in the terminal's field, a high-frequency voltage is generated across the transponder's resonant circuit. This voltage, after rectification, provides the supply voltage of the transponder's electronic circuits which generally comprise a microprocessor, a memory, a demodulator of signals that may be received from the terminal, and a modulator for transmitting information to the terminal. These electronic circuits may also be circuits in wired logic.

The transmission of information from the transponder to the terminal is generally performed by modifying the load of the oscillating circuit of this transponder, so that the latter draws a greater or smaller amount of power from the high-frequency magnetic field. This variation is detected on the terminal side since the amplitude of the high-frequency excitation signal is maintained constant. Accordingly, a variation in the power drawn by the transponder translates as an amplitude and phase variation of the current in the terminal's antenna. This variation is then detected by means of a phase demodulator and/or an amplitude demodulator.

The load variation on the transponder side is generally achieved by means of an electronic switch for controlling a resistor or a capacitor modifying the load of the oscillating circuit. The electronic switch is generally controlled at a so-called back modulation sub-carrier frequency (for example, 847.5 kilohertz) much smaller (generally, with a ratio of at least 10) than the frequency of the of the read/write terminal's oscillating circuit excitation signal.

U.S. Pat. No. 6,356,198, which is incorporated herein by reference, describes an electromagnetic transponder capacitive modulation system. It provides, between the transponder's resonant circuit and its rectifying means, a capacitive modulation circuit intended to modify the transponder load on the field radiated by the terminal.

A recurring problem of transponder systems is that different factors have an influence upon the transmission. Not only is the distance separating the transponder from the terminal likely to modify the amplitude and the phase of a signal received by the terminal, but also will electromagnetic disturbances of the system environment have an influence upon this transmission. The effects of this environment are generally desired to be reduced by maintaining the tuning of the oscillating circuits of the terminal and of the transponder on the same frequency (13.56 MHz). For this purpose, the tuning of the transponder's resonant circuit is generally modified by modifying (for example, by means of switchable capacitors) the equivalent value of the capacitor in parallel on the antenna of this resonant circuit. Such a tuning matching is described, for example, in U.S. Pat. No. 5,892,300, which is incorporated herein by reference. It is not a modulation at the rate of the sub-carrier to transmit information, but simply a modification of the tuning of the resonant circuit. Such a tuning matching especially enables maximizing the power received by the transponder remotely supplied by the terminal. This however does not solve the problem of the demodulation, by the terminal, of information transmitted by the transponder.

Another difficulty lies in the fact that neither the transponder nor the terminal knows, before transmission, whether transmitted data will be properly received.

SUMMARY OF THE INVENTION

The present invention aims at providing a novel solution to problems of quality of the signals received by a read/write terminal of electromagnetic transponders.

The present invention more specifically aims at providing a solution which adapts to dynamic variations (at each communication) of the quality of a transmission between at least one transponder and a terminal.

The present invention aims at providing a solution compatible with the exploitation of data transmitted by an amplitude and/or phase demodulator on the read/write terminal side.

The present invention further aims at providing a solution compatible with the modulation and coding types currently used by transponders. In particular, the present invention aims at providing a solution conforming to ISO standard 14443.

To achieve these and other objects, the present invention provides an electromagnetic transponder comprising:

an oscillating circuit;

an electronic circuit comprising a transmit circuit for transmitting digitally-coded information; and at least one first parameterizable resistive and capacitive modulation circuit, coupled to the oscillating circuit.

According to an embodiment of the present invention, a rectifying circuit is coupled to the oscillating circuit to provide a D.C. supply voltage to the electronic circuit, said first modulation circuit being placed between the oscillating circuit and said rectifying circuit.

According to an embodiment of the present invention, a second parameterizable resistive and capacitive modulation circuit is connected between the rectifying element and the electronic circuit.

According to an embodiment of the present invention, each modulation circuit comprises at least one resistive or capacitive modulation element, each element being individually controllable.

According to an embodiment of the present invention, each modulation circuit comprises at least one capacitor and one resistor in parallel.

According to an embodiment of the present invention, each modulation element is controllable by a modulation signal transmitted by the electronic circuit.

The present invention also provides a method for selecting at least one back modulation element of an electromagnetic transponder from among a plurality of resistive and/or capacitive elements for modulating the load of an oscillating circuit of the transponder, comprising of selecting the modulation element(s) according to a binary message received from a read/write terminal.

According to an embodiment of the present invention, said binary message is transmitted on a loop request by the read/write terminal.

According to an embodiment of the present invention, a transponder receiving said request responds by using modulation elements selected according to said binary message received from the terminal.

According to an embodiment of the present invention, the terminal stores a plurality of responses performed with different modulation elements and sends a last transmit request with a binary configuration message corresponding to the response received with the best quality.

The foregoing objects, features, and advantages of the present invention will be discussed in detail in the following non-limiting description of specific embodiments in connection with the accompanying drawings.

DETAILED DESCRIPTION

Figure 1:
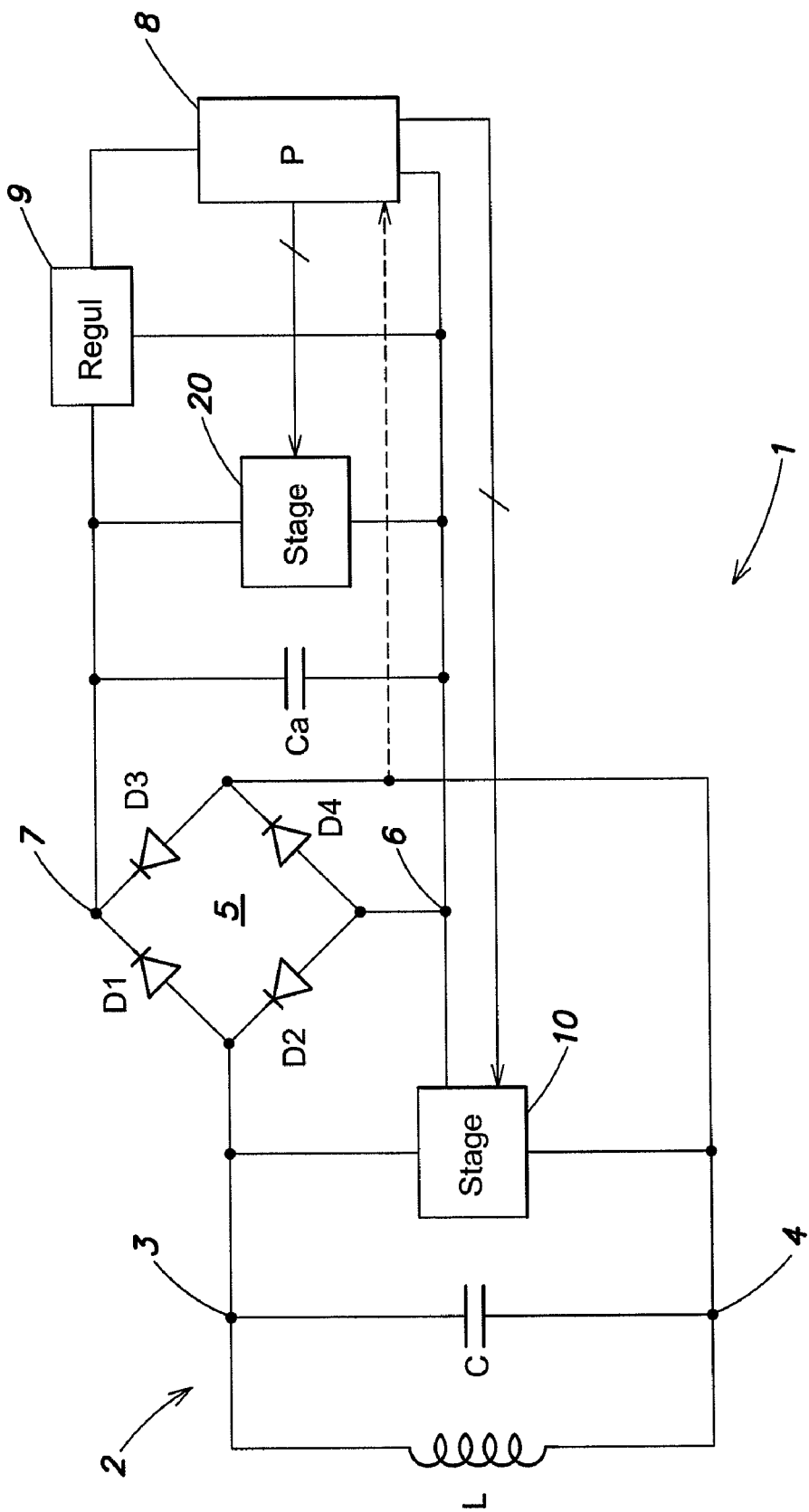
FIG. 1 very schematically shows, in the form of blocks, an embodiment of an electromagnetic transponder according to the present invention.

The same elements have been designated with the same reference numerals in the different drawings. For clarity, only those elements and method steps which are necessary to the understanding of the present invention have been shown in the drawings and will be described hereafter. In particular, the circuits for coding the data to be transmitted and the demodulation circuits have not been described in detail. The present invention can be implemented with conventional read/write terminal structures.

A feature of the present invention is to provide, on the transponder side, a capacitive and/or resistive back modulation.

Another feature of the present invention is to adapt the back-modulation type to the system operating conditions in real time. For this purpose, the present invention takes advantage of the structure of the exchanges between a terminal and a transponder according to which a terminal periodically transmits a query frame until a transponder responds. Thus, the present invention preferentially provides using this frame to send to the transponders that may be in the field bits for configuring their back modulation circuits.

FIG. 1 shows a transponder according to an embodiment of the present invention. Transponder 1 comprises a generally parallel resonant circuit 2 formed of an inductance L in parallel with a capacitor C to sense the field generated by an oscillating circuit of a terminal (not shown). Resonant circuit L-C of the transponder is preferably tuned to the frequency of the terminal's oscillating circuit, for example, by being adjusted by means of a system such as described in above-mentioned U.S. Pat. No. 5,892,300.

Terminals 3 and 4 of resonant circuit 2 (corresponding to the terminals of capacitor C) are connected to two A.C. inputs of a rectifying bridge 5 formed, for example, of four diodes D1, D2, D3, and D4. As an alternative, the rectifying element may be a halfwave rectifying element. The anodes of diodes D2 and D4 form a reference terminal 6 of the rectified voltage which defines the ground of the transponder circuits. The cathodes of diodes D1 and D3 define a positive rectified output terminal 7, terminals 3 and 4 being respectively connected to the anode of diode D1 (cathode of diode D2) and to the anode of diode D3 (cathode of diode D4). A capacitor Ca is connected in parallel on rectified terminals 6 and 7 of bridge 5 to filter the rectified voltage that it provides.

When the transponder enters the field of a read/write terminal, a high-frequency voltage is generated across resonant circuit 2. This voltage, rectified by bridge 5 and filtered by capacitor Ca, provides a supply voltage to electronic circuit 8 (P) of the transponder via a voltage regulator 9 (REGUL). Electronic circuits 8 of the transponder have been symbolized by a block. This block generally is a chip (most often integrating regulator 9) containing at least a memory and a processor.

To enable data transmission from transponder 1 to a read/write terminal, block 8 controls at least one stage 10 or 20 of back modulation of resonant circuit 2.

Preferred examples of a back-modulation circuit will be described hereafter in relation with FIGS. 2 and 3. For the time being, it should only be noted that each back-modulation stage 10, 20 comprises at least one electronic switch, at least one capacitor and at least one resistor to modify the load of oscillating circuit 2 and enable the corresponding detection on the terminal side.

Figure 2:
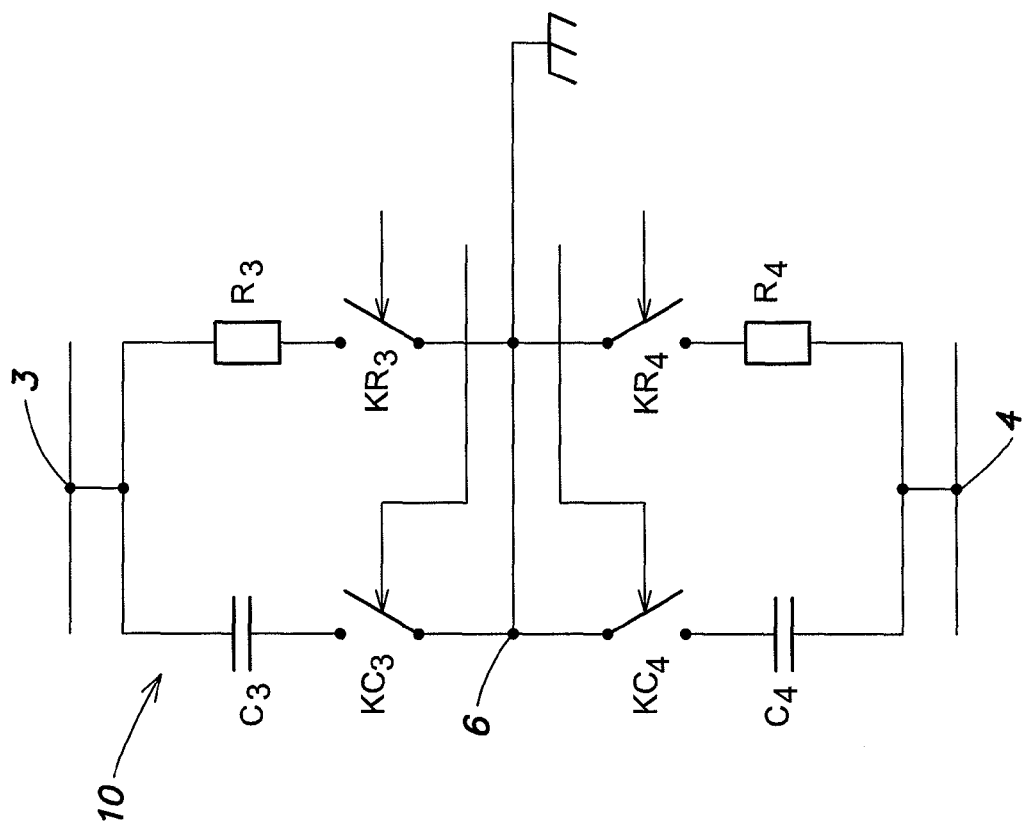
FIG. 2 shows a first embodiment of a back modulation circuit equipping a transponder according to the present invention.

FIG. 2 shows a first embodiment of a so-called back-modulation stage according to the present invention. Such a stage comprises, in parallel between terminals 3 and 6, at least one capacitor C3 and one resistor R3, both switchable. Capacitor C3 and resistor R3 are made switchable by being, for example, each series-connected with a switch KC3, KR3, individually controllable by the processor of circuit 8. For example, switches KC3 and KR3 are formed of MOS transistors.

According to the embodiment of FIG. 2, stage 10 comprises a similar structure between terminals 4 and 6. Thus, a capacitor C4 and a resistor R4, each in series with a switch KC4, respectively KR4, are connected in parallel between terminals 4 and 6.

The different modulation elements are individually controllable to optimize the reception of data by the terminal.

According to cases, it may be advantageous to perform a modulation which is only capacitive, only resistive, or both. Further, in case of a composite modulation, resistor R3 may be used at the same time as capacitor C4 or capacitor C3 at the same time as resistor R4 rather than the resistors and capacitors in parallel.

Figure 3:
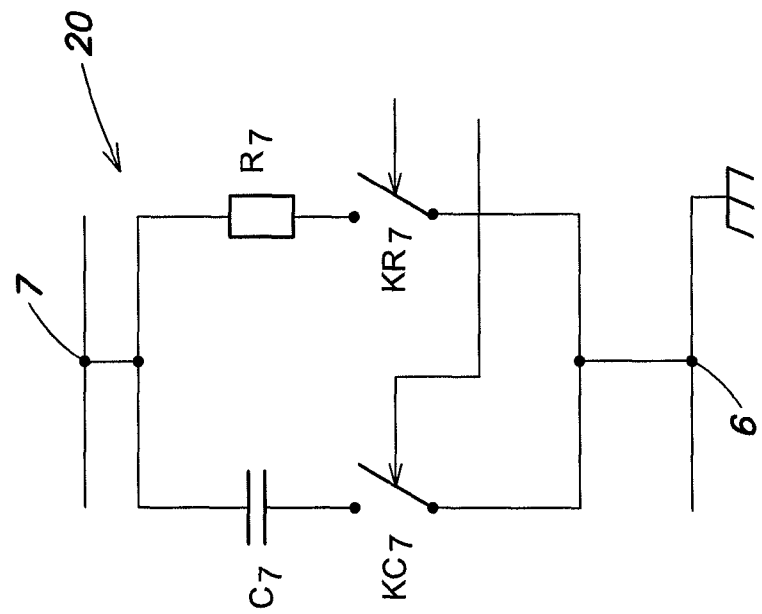
FIG. 3 shows a second embodiment of a back modulation circuit of a transponder according to the present invention.

FIG. 3 shows a second embodiment of a back-modulation stage 20 according to the present invention. This stage is intended to be located between the rectifying element and the electronic circuits rather than between the rectifying element and the resonant circuit as is the case of previously-described stage 10. In this case, a parallel connection of a capacitor C7 and of a resistor R7 between terminals 7 and 6. Capacitor C7 and resistor R7 are made individually controllable by means of a switch KC7, respectively KR7, receiving control signals from the processor of circuits 8.

Back-modulation stage 20 may be used instead or at the same time as back-modulation stage 10.

According to the present invention, during a same transponder-to-terminal transmission, the same modulation switches are switched at the rate of the transmit sub-carrier. However, the configuration chosen for the ON and OFF positions of the switches is likely to be modified from one communication to another.

Figure 4:
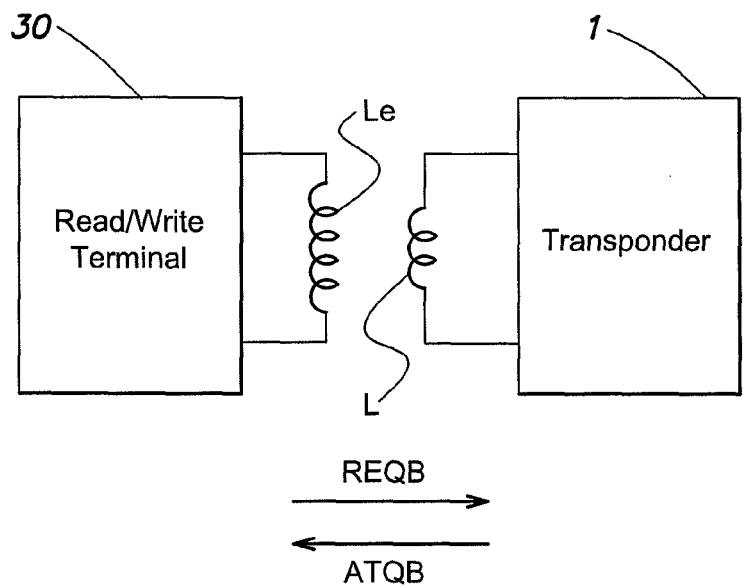
FIG. 4 very schematically shows a system of communication between a terminal and a transponder according to the present invention.

FIG. 4 very schematically illustrates a read/write terminal 30 and its antenna Le, and a transponder 1 according to the present invention and its antenna L.

Conventionally, a terminal 30 monitors the presence of a transponder 1 in the field radiated by its antenna Le by periodically sending a frame REQB capable of being captured by a transponder when it is present in the field. As soon as a transponder captures and decodes a frame REQB transmitted by a terminal, it responds with an acknowledgement ATQB. This response is performed by switching the load added on the oscillating circuit at the rate of the back-modulation sub-carrier.

According to a preferred embodiment of the present invention, this switching is only performed for the switches of the back-modulation circuits which correspond to the selected configuration. As an alternative, two switches in series may be provided for each element. A first switch is then used as a selection or configuration switch and receives a signal after the decoding of frame REQB or the like. A second switch is used as a modulation switch and is controlled, with all the switches of the same type, by the back modulation signal. However, the preferred embodiment has the advantage of simplifying the control and of consuming less.

According to ISO standard 14443, frames REQB and ATQB have specific formats. It should however be noted that the present invention is not limited to these frames and may be implemented as soon as a terminal periodically sends interrogation messages to transponders possibly present in its field and that a transponder, as soon as it is present, responds with a specific message. Further, the present invention is compatible with systems, or a same terminal may communicate with several transponders.

Figure 5:
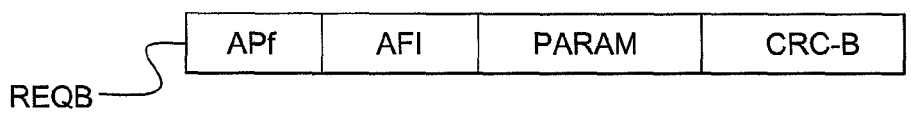
FIG. 5 illustrates the structure of an example of a query frame from a terminal intended for transponders likely to be present in its field.

FIG. 5 illustrates the structure of a frame REQB according to ISO standard 14443 taken as an example. This frame first comprises an APf byte forming an anticollision prefix. The APf byte is followed by an AFI byte (Application Family Identifier) which represents the type of application(s) aimed at by the terminal and which is used to preselect the type of transponders likely to respond to a given REQB frame. Byte AFI is followed by an anticollision parameterizing byte PARAM, itself followed by two bytes CRC-B containing a calculation performed on the preceding bytes, enabling detection of communication errors.

In this example, the present invention preferably uses bits of byte PARAM to transmit an order of configuration of the back-modulation circuits of any transponder present in the field of the terminal.

Figure 6:
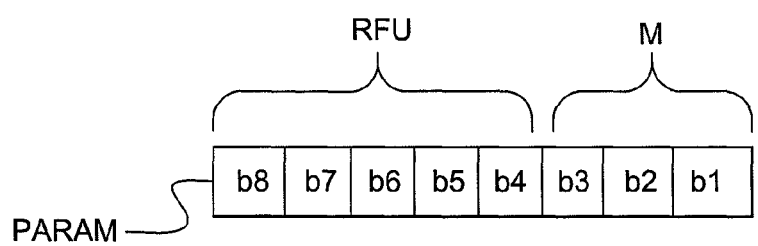
FIG. 6 illustrates the structure of a word of the frame of FIG. 5.
Figure 7:
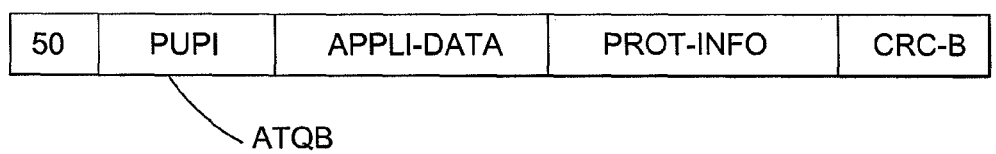
FIG. 7 illustrates the structure of an example of a response frame of a transponder according to an embodiment of the present invention.

Indeed, as illustrated in FIG. 6 which shows the structure of a byte PARAM according to standard 14443, the first three bits B1, B2, B3 are used to set an anticollision parameter M while the five other bits B4, B5, B6, B7, and B8 are free (RFU).

Thus, the present invention provides using these five bits to transmit a code to a transponder of the type of that in FIG. 1 to set the back modulation type desired for it. Five available bits represent 32 possible combinations, which is widely enough. These combinations may, for example, be the different possible combinations of the control signals of the different switches KC and KR of FIGS. 1 and 2. According to an alternative embodiment, more than one capacitor and one resistor are provided in parallel in the back-modulation circuits, which increases the number of possible configurations.

It should be noted that whether all the transponders have the same structure in terms of back modulation circuit matters little. What matters is that, for a transponder capable of performing different back modulations, it is provided for it to interpret bits B4 to B8 of word PARAM as different control values of the modulation type to be performed. Thus, any reader sending a combination, for example, sequential, of the states of bits B4 to B8, will necessarily come across the optimal combination by exploiting the transponder responses. Further, whether a transponder is or not capable of interpreting all the combinations of bits B1 to B8, in particular if it does not have the same number of possible combinations in its back modulation circuits, matters little. What matters is that according to the number of its own possible combinations, it conditions each combination of its switches upon occurrence of a combination of configuration bits B4 to B8.

When a transponder decodes a frame REQB, it responds thereto with a frame ATQB. A frame ATQB according to standard 14443 comprises 14 bytes. A first byte contains a fixed value (for example, number 50). The next three bytes contain an identifier PUPI (Pseudo Unique Picc Identifier) of the transponder. The next four bytes (APPLI-DATA) identify the type of application(s) contained in the transponder. The next three bytes (PROT-INFO) contain information about the communication protocol, and the last two bytes CRC-B contain the CRC calculation.

This response is, according to the present invention, performed by using a specific back modulation type which is a function of the combination set by bits B4 to B8 of word PARAM. When the reader receives message ATQB and decodes it, it is able to determine whether the level that it receives is or is not sufficient.

According to a first embodiment, a threshold is used on the terminal side to determine whether a receive level is or is not satisfactory. In this case, the different combinations of configuration bits B4 to B8 are successively sent in frames REQB and, as soon as a frame ATQB is received with a sufficient level, it is proceeded to the rest of the communication, without transmitting the other frames REQB. The back-modulation circuits of the transponder remain in this configuration until occurrence of a new frame REQB.

According to another preferred embodiment, frame REQB is sent in a loop by using all possibilities (32 in the case of message RFU) and by storing the level received by the respective response frames ATQB. Once the best combination has been determined by the terminal, said terminal reuses word PARAM for a last time to set the desired back-modulation time in the transponder.

As for the transponder, it keeps the configuration set by a frame REQB until arrival of the next frame REQB, that is, until the next transmission.

Such a scanning of different possibilities is compatible with the transmission rates. Indeed, the usual duration of a request REQB is on the order of 380 microseconds and the usual duration of a response ATQB is on the order of one millisecond, which is negligible as compared to the displacement speed of a transponder in front of the terminal, which is of a few hundreds of milliseconds (displacement speed of a hand). The usual duration of a transmission between a terminal and a transponder before starting requests REQB generally is on the order of several tens of milliseconds, which here again is compatible with the duration required to set, by the implementation of the present invention, the back modulation type.

An advantage of the present invention is that it enables optimizing the level of reception by the terminal whatever the possible present disturbances.

Another advantage of the present invention is that it enables dynamic matching, that is, matching on each exchange between a transponder and a terminal.

Another advantage of the present invention it that it requires no modification of the structure of conventional terminals. It is enough, for standard 14443, to provide specific bits B4 to B8 in frame REQB transmitted in a loop by the terminal. After, the exploitation of the level received by the demodulator is generally present in the conventional terminal and the exploitation of the results is compatible with a software use which requires no structural modification of the terminal.

Another advantage of the present invention is that it is compatible with transponders having different parameterizable back modulation circuits. Indeed, the aim being to select the best available back-modulation circuit for a given transponder, whether these back-modulation circuits are or not better than a neighboring transponder matters little.

The present invention also provides optimizing the communication in the case where the transponder is laid on the terminal. In this case, the times required for the choice of the configuration are even more negligible.

Of course, the present invention is likely to have various, alterations, improvements, and modifications which will readily occur to those skilled in the art. In particular, although the present invention has been described in relation with a preferred embodiment adapted to ISO standard 14443, it may be provided to modify a frame of loop transmission by a terminal to adapt to other transmit systems. Further, the practical implementation of the present invention by hardware and/or software means is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An electromagnetic transponder comprising:
   an oscillating circuit;
   an electronic circuit comprising a transmit circuit for transmitting digitally-coded information and a receive circuit adapted to receive, from a terminal, a configuration signal at a start of each communication session between the electromagnetic transponder and the terminal; and
   at least one first configurable modulation circuit coupled to the oscillating circuit, the at least one configurable modulation circuit comprising a plurality of circuit elements, the plurality of circuit elements comprising at least one resistive or capacitive modulation element, each circuit element being associated with at least one switch to control a power applied to the circuit element, wherein the configuration signal from the terminal specifies a particular arrangement of switches to control power applied to circuit elements of the at least one first configurable modulation circuit to produce a particular modulation scheme for signals transmitted from the electromagnetic transponder.

2. The transponder of claim 1, wherein a rectifying circuit is coupled to the oscillating circuit to provide a D.C. supply voltage to the electronic circuit, said first configurable modulation circuit being placed between the oscillating circuit and said rectifying circuit.

3. The transponder of claim 2, wherein a second configurable modulation circuit is connected between the rectifying element and the electronic circuit.

4. The transponder of claim 1, wherein each configurable modulation circuit of the at least one first configurable modulation circuit comprises at least one capacitor and one resistor in parallel.

5. The transponder of claim 1, wherein each modulation element of the at least one resistive or capacitive modulation element is controllable by a modulation signal transmitted by the electronic circuit.

6. The electromagnetic transponder of claim 1, wherein the at least one first configurable modulation circuit is configured by the electronic circuit to alter a load placed on the oscillating circuit.

7. A method for selecting at least one back-modulation element of an electromagnetic transponder from among a plurality of resistive and/or capacitive elements for modulating the load of an oscillating circuit of the transponder, the method comprising:
   at a start of each communication session between the electromagnetic transponder and a read/write terminal, selecting the at least one back-modulation element to conduct a signal to the oscillating circuit according to a binary message received from the read/write terminal, the binary message specifying at least one particular back-modulation element of the at least one back-modulation element of the electromagnetic transponder to conduct the signal so as to produce a particular modulation scheme for signals transmitted from the electromagnetic transponder, the at least one back-modulation element comprising at least one resistive or capacitive back-modulation element, each back-modulation element of the at least one back-modulation element being associated with a switch that controls a power applied to the back-modulation element; and
   controlling a state of switches associated with each of the selected at least one back-modulation element such that the signal is conducted to the oscillating circuit via the selected at least one back-modulation element.

8. The method of claim 7, wherein said binary message is transmitted on a loop request by the read/write terminal.

9. The method of claim 8, wherein a transponder receiving said request responds by using modulation elements selected according to said binary message received from the terminal.

10. The method of claim 9, wherein the terminal stores a plurality of responses performed with different modulation elements and sends a last transmit request with a binary configuration message corresponding to the response received with the best quality.

11. A method of controlling a transponder comprising an oscillating circuit, the method comprising:
   A) receiving at the transponder, at a start of each communication session between the transponder and another communication device, an indicator specifying a particular arrangement of circuit elements of the transponder to produce a particular modulation scheme for signals transmitted from the electromagnetic transponder;
   B) controlling one or more switches to control a power applied via one or more modulation elements to the oscillating circuit to configure the transponder according to the particular arrangement specified by the indicator, the one or more modulation elements comprising at least one resistive or capacitive modulation element; and C) communicating information at least from the transponder to the other communication device using the oscillating circuit coupled to the one or more modulation elements.

12. The method of claim 11, wherein controlling the one or more switches according to the indicator alters at least one of an amplitude, phase variation, and frequency for the oscillating circuit.

13. The method of claim 11, wherein the other device is a terminal proximate to the transponder, and the indicator is received from the terminal.

14. The method of claim 13, wherein the indicator is a portion of a frame received by the transponder from the terminal.

15. The method of claim 14, wherein the frame is a frame according to ISO standard 14443.

16. The method of claim 15, wherein the frame is a REQB frame.

17. The method of claim 11, wherein controlling one or more switches comprises controlling one or more first switches in a first group and one or more second switches in a second group.

18. The method of claim 11, further comprising transmitting data according to the communication configuration.

19. A method of communicating between a terminal and a transponder, the method comprising:

A) at a start of each communication session between the terminal and the transponder, receiving from the terminal at the transponder an indicator specifying a particular arrangement of circuit elements for the transponder to produce a particular modulation scheme for signals transmitted from the electromagnetic transponder, the particular arrangement of circuit elements for the electromagnetic transponder identifying at least one circuit element by which a signal is to be conducted to generate signals from the electromagnetic transponder, each circuit element of the circuit elements being associated with a switch that controls a power applied to the circuit element;

B) configuring the transponder to communicate according to the indicator by controlling a state of switches associated with the at least one circuit element such that a signal is conducted via the at least one circuit element, the at least one circuit element comprising at least one resistive or capacitive modulation element; and C) communicating data from the transponder to the terminal according to the particular modulation scheme.

20. The method of claim 19, wherein configuring the transponder comprises controlling one or more switches to couple one or more modulation elements to an oscillating circuit of the transponder.

21. The method of claim 19, further comprising an act of repeating the acts of transmitting, configuring, and communicating over a plurality of iterations to determine an optimal arrangement of circuit elements.

22. The method of claim 21, wherein the act of repeating comprises sequentially transmitting all possible indicators of arrangements of circuit elements.

23. The method of claim 21, further comprising an act of transmitting a final indicator of an arrangement of circuit elements, the final indicator indicating the optimal arrangement determined over the plurality of iterations.

* * * * *